INVENTOR.
ROBERT E. RODGERS
BY Harold B. Hood
ATTORNEY

United States Patent Office 3,053,408
Patented Sept. 11, 1962

3,053,408
RADIATOR CAP WITH SAFETY GASKET
Robert E. Rodgers, Connersville, Ind., assignor to Stant Manufacturing Company, Inc., Connersville, Ind., a corporation of Indiana
Filed Sept. 8, 1960, Ser. No. 54,672
4 Claims. (Cl. 220—44)

The present invention relates to a safety cap for automobile cooling systems primarily of the pressure type, and is particularly concerned with the provision of means to prevent steam or water from escaping, past the cap body, as the valve conventionally forming a part of such a cap is removed from its seat during removal of the cap.

The primary object of the invention is to provide, in a cap of the character under consideration, closure means responsive to fluid flow to seal the outer end of an automobile radiator filler neck against the escape of fluid past the cap to scald a person in the act of removing the cap from the filler neck.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
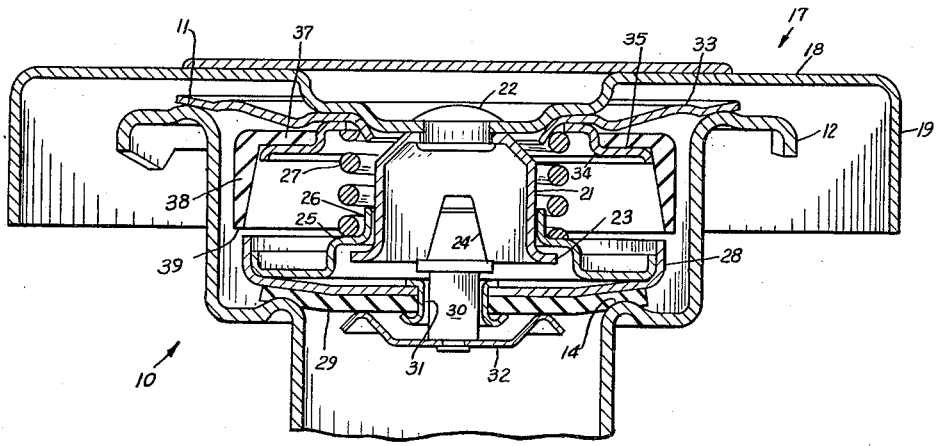
Figure 2:
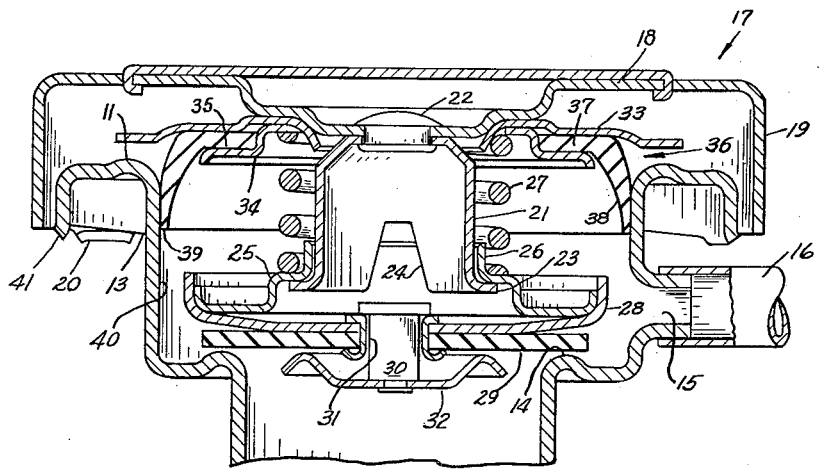

FIG. 1 is a vertical section through a cap constructed in accordance with the present invention, the cap being shown in fully seated position on a conventional filler neck; and FIG. 2 is a similar section showing the cap in its "dwell" position, with the parts of the cap assembly in their positions assumed during the relief of operating pressure within the engine cooling system.

Most cooling systems for automobile engines today are constructed to operate under working pressures of from two to twenty pounds above atmospheric pressure. The optimum pressure is maintained within such a system by a spring pressed valve, carried by the closure cap for the filler neck of the system and bearing upon a seat within such filler neck. Above that seat, a vent port is formed in the filler neck. The cap and the filler neck are provided with cooperating means for retaining the cap in position with the valve resiliently pressed against the seat. Such retainer means is customarily so designed that, as the cap is turned toward a position in which it may be removed from the filler neck, it achieves a "dwell" position wherein its further rotation toward removal is deterred but not completely prevented. In this "dwell" position, the above-mentioned valve is off its seat to place the interior of the cooling system in communication with the vent port, and a diaphragm within the cap is supposed to rest on the lip of the filler neck to inhibit escape of fluid through the mouth of the filler neck; but it is found in practice that, in some instances, the diaphragm is not effective to perform that function and steam or hot liquid will escape around the cap and come into contact with the hand of a person manipulating the cap.

Referring more particularly to the drawings, it will be seen that I have illustrated a conventional filler neck, indicated generally by the reference numeral 10 and formed to provide a lip or seat 11 at its upwardly opening mouth, terminating in a downturned flange 12 provided, at its distal edge, with a pair of cammed surfaces 13. At a level below the seat 11, the filler neck is formed to provide a pressure valve seat 14; and between those seats the filler neck is formed with a vent port 15 to which, conventionally, is attached a hose or conduit 16 leading to a remote point at which it is open to the atmosphere.

A cap constructed in accordance with the present invention is indicated generally by the reference numeral 17 and comprises a discoid cap body 18 having a downturned, perimetral flange 19 which, at its lower edge, carries a pair of diametrically opposed retainer fingers 20 engageable with the flange surfaces 13 to seat and retain the cap in position on the filler neck. The neck flange is formed with diametrically opposed notches (not shown) through which the fingers 20 may be entered, whereafter rotation of the cap in a clockwise direction will move the fingers 20 along the cam surfaces 13 to press the cap downwardly on the neck 10.

A bell 21 is secured in depending relation to the cap body 18 by means of a central rivet 22 and terminates at its lower end in an outturned flange 23, said bell being formed with one or more notches 24 opening through its lower edge. A collar 25, having a flange 26, is loosely sleeved on the bell 21, the parts being so proportioned and designed that the flanges 26 and 23 are engageable to limit movement of the collar 25 away from the cap body 18. A coiled spring 27 surrounds the bell 21, which constitutes support means for the collar 25, and resiliently resists movement of the collar 25 toward the cap body.

An element 28 is fixed to the collar 25 and, on its surface remote from the cap body 18, carries a gasket 29, the element 28 and the gasket 29 comprising a pressure valve engageable with the seat 14 in the manner illustrated in FIG. 1.

A stem 30, having an enlarged head, is loosely reciprocably mounted within a hollow rivet 31 penetrating the pressure valve and, at its lower end, carries a vacuum valve 32 engageable with the gasket 29. When the gasket 29 is seated on the seat 14 and the pressure within the cooling system exceeds atmospheric pressure, the valve 32 is held in engagement with the gasket 29 to close the opening through the rivet 31; but at other times the valve 32 will be spaced from the gasket 29 in the manner illustrated in FIG. 2.

A flexible diaphragm 33 is supported in place by the spring 27 and, when the cap is fully seated on the filler neck, engages the seat 11 at the mouth of the filler neck. The parts as thus far described are conventional.

According to the present invention, an annular pan 34 is resiliently pressed against the diaphragm 33 by the spring 27 and is formed to provide an annular shoulder 35 spaced below the diaphragm 33 and defining a surface facing the cap body 18. An annular gasket, indicated generally by the reference numeral 36, has a discoid body portion 37 supported upon the shoulder 35 and is formed with a downturned, softly resiliently flexible annular skirt 38 which depends below the pan 34 and which is progressively reduced in thickness toward its free edge 39. The gasket 36 may be formed of soft rubber or rubberoid material, the essential characteristics being that it shall be softly resiliently flexible and substantially fluid-proof. Preferably, the diameter of the edge 39 of the skirt 38 will be substantially equal to the diameter of the pressure valve 28, 29, when the skirt is in equilibrium.

Under normal operating conditions, and with the cap fully seated on the filler neck as shown in FIG. 1, the chamber defined between the seats 11 and 14 within the filler neck will be under atmospheric pressure while the pressure for which the system was designed will be maintained in the interior of the cooling system. When the engine is stopped and begins to cool, the pressure within the cooling system will gradually drop until, as that pressure approaches atmospheric value, the weight of the stem 30 and the valve 32 will cause the stem and valve to drop to the position of FIG. 2, whereupon the system will be vented to the atmosphere.

If the pressure within the system should rise beyond the designed value, the valve 28, 29 will be lifted, against the tendency of the spring 27, to vent the system to the port 15.

When an attendant turns the cap 17 toward a position in which the fingers 20 will register with the above-mentioned notches to permit removal of the cap from the filler neck, the cap body will move upwardly relative to the filler neck, carrying with it the support means 21 until the flange 23 engages the flange 26. Just after engagement of those flanges, the fingers 20 come into engagement with shallow projections 41 on the downturned edge of the flange 12. This is the "dwell" position of the cap, in which the valve 28, 29 is off the seat 14 and in which the diaphragm 33 is supposed still to be in engagement with the lip 11 to inhibit escape of fluid through the upwardly opening mouth of the filler neck. As suggested in FIG. 2, however, the diaphragm 33 may be lifted off the seat 11. In this position of the cap, fluid may be flowing quite violently past the valve 28, 29; and, since the vent port 15 is relatively small, such fluid tends, by momentum, to flow upwardly and to escape past the seat 11. However, as it flows toward that seat, the fluid stream will encounter the depending skirt 38 and, since said skirt is softly flexible, the skirt will be moved outwardly to the position of FIG. 2 and into engagement with the annular internal wall 40 of the filler neck, thus affirmatively sealing the mouth of the filler neck against fluid flow therepast.

This sealing means may advantageously be used in connection with the latch means disclosed and claimed in the copending applications of Eldred R. Bowden, Serial No. 50,781, filed August 19, 1960, and Serial No. 65,072, filed October 26, 1960.

I claim as my invention:

1. A safety pressure radiator cap comprising a discoid cap body, support means depending substantially centrally from said cap body, a pressure valve mounted on said support means for limited movement toward and away from said cap body, a coiled spring confined between said cap body and said valve and resiliently resisting movement of said valve toward said cap body, and a gasket disposed between said cap body and said valve, said gasket having a resiliently-flexible, annular skirt depending away from said cap body toward said valve, said skirt being substantially cylindrical when in equilibrium, having an external diameter closely approximating that of said valve and free, at its edge nearest said valve, for radially-outward flexure.

2. A safety pressure radiator cap comprising a discoid cap body, support means depending substantially centrally from said cap body, a pressure valve mounted on said support means for limited movement toward and away from said cap body, a coiled spring confined between said cap body and said valve and resiliently resisting movement of said valve toward said cap body, and a gasket disposed between said cap body and said valve, said gasket having a resiliently-flexible, annular skirt depending away from said cap body toward said valve, said skirt being substantially cylindrical when in equilibrium, having an external diameter closely approximating that of said valve and free, at its edge nearest said valve, for radially-outward flexure, said skirt being progressively reduced in thickness toward the free edge thereof.

3. A safety pressure radiator cap comprising a discoid cap body, support means depending substantially centrally from said cap body, a pressure valve mounted on said support means for limited movement toward and away from said cap body, a coiled spring confined between said cap body and said valve and resiliently resisting movement of said valve toward said cap body, a pan encircling said support closely adjacent said cap body, said pan being formed to provide an annular shoulder having a surface spaced from said cap body toward said valve and presented toward said cap body, and an annular gasket having a discoid body supported on said shoulder surface and having a softly-resilient skirt depending therefrom toward said valve.

4. For use with a filler neck for an automobile radiator, said filler neck having a cammed lip, a pressure valve seat, and an overflow vent between said lip and said seat; a safety pressure cap comprising a cap body provided with retainer means engageable with such a lip to retain said cap on such a neck, support means depending substantially centrally from said cap body for disposition within such a neck when said cap is so retained, a pressure valve mounted on said support means for limited movement toward and away from said cap body, spring means resiliently resisting movement of said valve toward said cap body, said parts being so proportioned and arranged that when said cap body is fully seated on such a neck said spring means resiliently presses said valve against the pressure seat thereof but when said retainer means is engaged with such a filler neck lip in an intermediate position said valve is out of sealing engagement with such seat, and a gasket supported from said cap body and having a resiliently-flexible, annular skirt depending toward said valve and disposed, when said cap body is seated on such a neck, between said support means and the internal surface of such neck, said skirt being constructed and arranged to be flexed radially outwardly into sealing engagement with the internal surface of such neck in a region between the vent and the lip of such neck by fluid under pressure moving from such valve seat toward such lip.

References Cited in the file of this patent
UNITED STATES PATENTS
2,684,780    Friend _____ July 27, 1954